United States Patent [19]
Larson

[11] Patent Number: 6,031,550
[45] Date of Patent: Feb. 29, 2000

[54] PIXEL DATA X STRIPING IN A GRAPHICS PROCESSOR

[75] Inventor: Michael K. Larson, Kirkland, Wash.

[73] Assignee: Cirrus Logic, Inc., Fremont, Calif.

[21] Appl. No.: 08/968,388

[22] Filed: Nov. 12, 1997

[51] Int. Cl.[7] .................................................. G06F 13/00
[52] U.S. Cl. ........................ 345/511; 345/503; 345/525
[58] Field of Search ........................... 345/418, 501–503, 345/520, 521, 523–526, 507, 509, 516, 508, 511, 203; 711/1, 3, 100, 104, 118, 165

[56] References Cited

U.S. PATENT DOCUMENTS

| | | | |
|---|---|---|---|
| 3,988,728 | 10/1976 | Inoue et al. | 345/121 |
| 4,189,728 | 2/1980 | Stubben | 345/121 |
| 4,267,573 | 5/1981 | Chaikin et al. | 382/296 |
| 4,546,451 | 10/1985 | Bruce | 345/517 |
| 4,906,986 | 3/1990 | Takeda | 345/203 |
| 4,935,880 | 6/1990 | Kelleher et al. | 345/510 |
| 4,965,751 | 10/1990 | Thayer et al. | 345/516 |
| 4,974,175 | 11/1990 | Suzuki et al. | 345/433 |
| 5,043,717 | 8/1991 | Takeda | 345/203 |
| 5,088,050 | 2/1992 | Ito | 345/442 |
| 5,131,080 | 7/1992 | Fredrickson et al. | 345/515 |
| 5,170,468 | 12/1992 | Shah et al. | 345/501 |
| 5,193,148 | 3/1993 | Alcorn et al. | 345/343 |
| 5,218,674 | 6/1993 | Peaslee et al. | 345/525 |
| 5,233,689 | 8/1993 | Rhoden et al. | 345/517 |
| 5,251,296 | 10/1993 | Rhoden et al. | 345/517 |
| 5,287,452 | 2/1994 | Newman | 345/520 |
| 5,311,211 | 5/1994 | Simpson | 345/509 |
| 5,325,486 | 6/1994 | Omori et al. | 345/511 |
| 5,329,617 | 7/1994 | Asal | 345/517 |
| 5,347,621 | 9/1994 | Yutaka | 345/431 |
| 5,347,624 | 9/1994 | Takanashi et al. | 345/431 |
| 5,357,605 | 10/1994 | Rupel et al. | 345/511 |
| 5,414,811 | 5/1995 | Parulski et al. | 345/501 |
| 5,430,838 | 7/1995 | Kuno et al. | 345/344 |
| 5,455,908 | 10/1995 | Ishida | 345/516 |
| 5,461,712 | 10/1995 | Chelstowski et al. | 345/514 |
| 5,486,876 | 1/1996 | Lew et al. | 348/719 |
| 5,517,609 | 5/1996 | Guillemaud et al. | 345/517 |
| 5,522,021 | 5/1996 | Huang et al. | 345/438 |
| 5,602,984 | 2/1997 | Mieras | 345/501 |
| 5,736,988 | 4/1998 | Shaw et al. | 345/423 |
| 5,760,780 | 6/1998 | Larson et al. | 345/422 |
| 5,815,168 | 9/1998 | May | 345/516 |
| 5,828,382 | 10/1998 | Wilde | 345/501 |
| 5,852,443 | 12/1998 | Kenworthy | 345/431 |

OTHER PUBLICATIONS

U.S. application No. 08/667,207, May et al., filed Jun. 20, 1996.
U.S. application No. 08/576,871, May, filed Dec. 20, 1995.
U.S. application No. 08/968502, Larson, filed Nov. 12, 1997.

Primary Examiner—Ulka J. Chauman
Attorney, Agent, or Firm—Steven A. Shaw

[57] ABSTRACT

A graphics system includes a graphics processor for rendering graphics primitives with a list of display parameters. A host processor generates a display list which includes a XY address for rendering the graphics primitives. A graphics processor which includes internal fetch and store static random access memory (SRAM)devices for storing pixel fetched from an external memory device and processed in the graphics processor respectively. The graphics processor also includes a pixel data striping control logic which determines whether fetch and store requests by the graphics processor crosses an X boundary in the internal SRAM devices. If a fetch or store request crosses an X boundary, the memory control logic stripes the access into separate blocks of pixel data for each access which are then simultaneously accessed during a single data request cycle. By striping pixel data accessed, the graphics processor is able to execute a single pixel dat request without crossing a X boundary even if the original pixel data being accessed spans multiple tiles in the memory device.

13 Claims, 9 Drawing Sheets

| ADDRESS | BYTE1 | BYTE2 | BYTE3 | BYTE4 | BYTE5 | BYTE6 | BYTE7 |
|---------|-------|-------|-------|-------|-------|-------|-------|
| 00000h  | P1,1  | P1,2  | P1,3  | •     | •     | •     | P1,128 |
| •       |       |       |       |       |       |       |       |
| •       |       |       |       |       |       |       |       |
| •       |       |       |       |       |       |       |       |
| BF800h  |       |       |       |       |       |       |       |

Fig. 3
(Prior Art)

| ADDRESS | BYTE1  | BYTE2  | • | • | • | BYTE2048 |
|---------|--------|--------|---|---|---|----------|
| 00000h  | T01,1  | T01,2  | • | • | • | T01,2048 |
| •       | •      | •      | • | • | • | •        |
| •       | •      | •      | • | • | • | •        |
| •       | •      | •      | • | • | • | •        |
| BF800h  | T3831,1| •      | • | • | • | T38316,128 |

PIXEL DATA X STRIPING IN A GRAPHICS PROCESSOR

FIELD OF INVENTION

The present invention relates generally to improvements in a graphics processor for computers. More particularly, the present invention relates to a graphics processor having an internal storage device utilizing a tile addressing scheme.

DESCRIPTION OF THE RELATED ART

Figure 1:
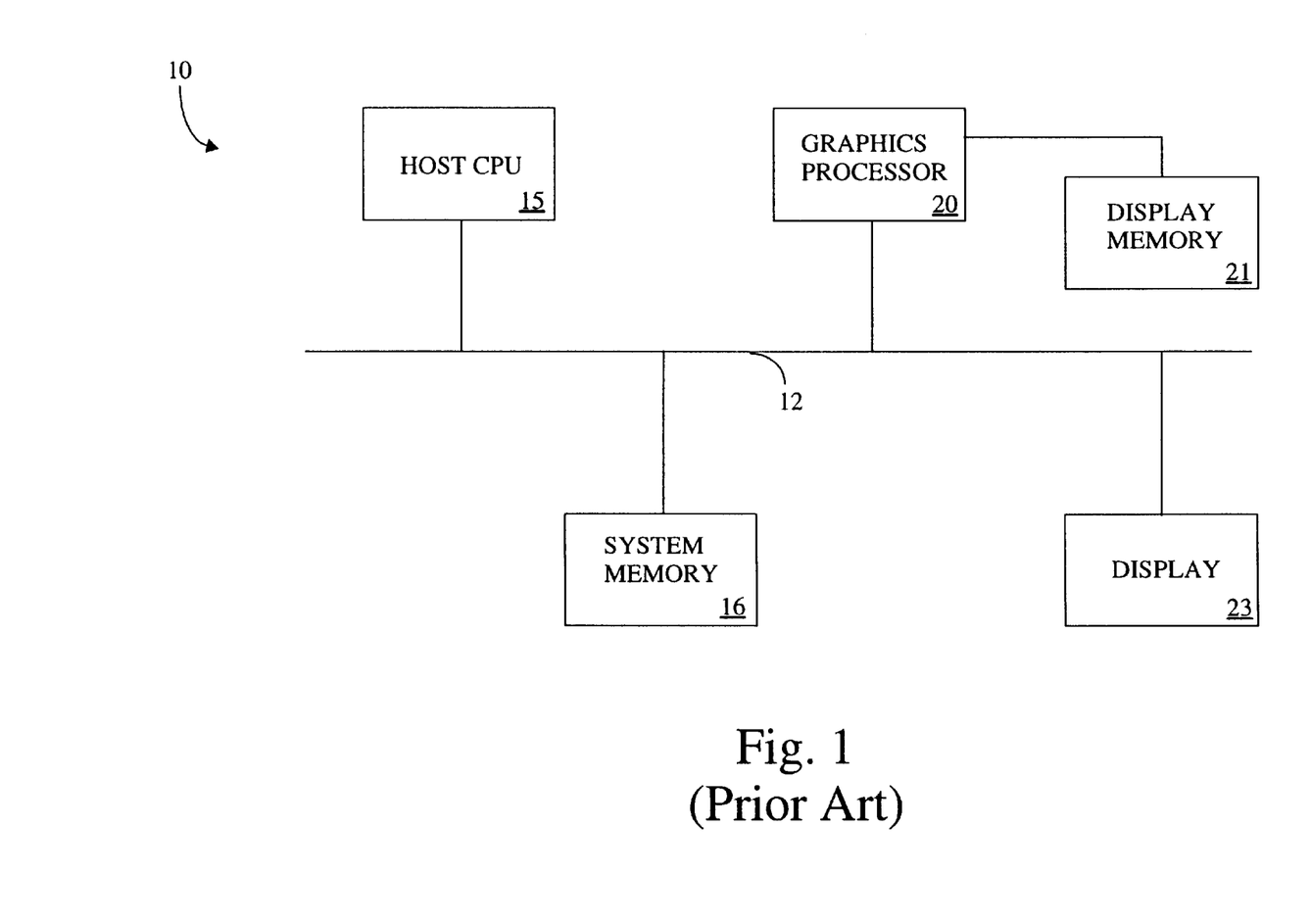
FIG. 1 is a simplified block diagram of a prior art computer system.

FIG. 1 is a simplified block diagram illustrating the major components of a prior art computer system 10 provided with a graphics processor 20. Graphics processor 20 generates pixel data for display 23 at a rate characteristic of the scanning rate of display 23.

Graphics processor 20 is provided with display memory 21 which stores pixel data in text and graphics for output to display 23. Host processor 15 is coupled to graphics processor 20 via system bus 12 for providing display parameter values in the form of a display list and to update the contents of display memory 21 when a display image to be generated on display memory 21.

Display memory 21 comprises of a dynamic random access memory (DRAM) or the like. DRAMs are characteristically organized as a two dimensional array of bit cells divided into rows and columns of bit cells. DRAMs typically replicate these arrays once for each I/O bit. For example, a 16 bit wide DRAM has arrays each of which contributes one data bit. Accessing a row of the array causes that row to be cached in the DRAM. Subsequent accesses to data words in different columns of the same row (column access) are therefore much faster than accesses to different row (row accesses).

Accesses within a row can be made in what is referred to as a page mode access, whereas accesses to different rows may require a page miss or random access memory cycle. A page mode access may take on the order of 2–4 memory clock cycles; whereas a random access may take on the order of 6–9 memory clock cycles. In order to enhance performance of the graphics processor 20, it is preferable to use a DRAM that accesses data in a random mode rather than in page mode and thus minimize the number of row accesses.

In order to ensure a continued stream of pixel data at the characteristic rate of display 23, the display memory 21 stores the pixel data in a sequential addressed format corresponding to the scanline order of the display 23.

Figure 2:
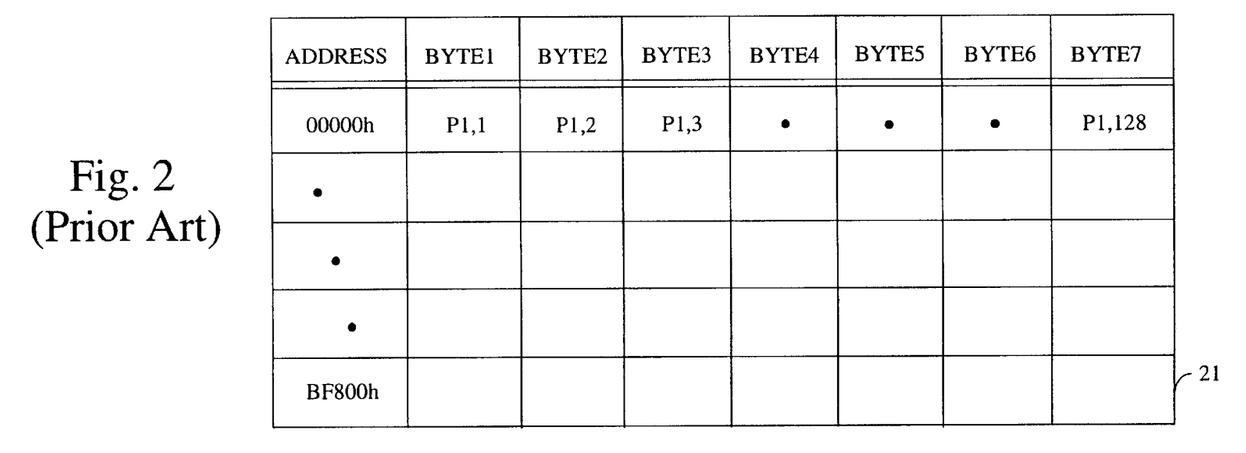
FIG. 2 is a block diagram illustrating how a prior art display memory is organized on a scan line basis.

FIG. 2 illustrate shows how a prior art display memory 21 is organized on a scan line basis. The display memory shown in FIG. 2 illustrates how an individual pixel data is stored within display memory 21. The addresses shown in FIG. 2 are for illustrative purposes only.

The display memory 21 shown in FIG. 2 shows a row size of 2048 bytes. Thus, data for two scan lines for display 23 can be stored in one row of display memory 21. Each pixel Pxy can be stored in a different byte location in display memory 21 where x represents scan line number (1-768) and y represents pixel location (1-1024). Each scan line to be displayed on display 23 may be stored within a page or pages of display memory 21 allowing for the use of page mode addressing when outputting data. Such an ordering technique allows for quick sequential output of pixel data to display 23. When data is to be retrieved from display memory 21 to refresh display 23, individual pixel data is retrieved in successive fashion from display memory 21 using page mode access.

However, with the advent of advanced graphics applications, such sequential scan-line based addressing scheme creates a bottleneck when data is written to the display memory 21. Graphics operations have certain characteristics which are different than other memory applications in that graphics operations tend to be either two or three dimensional. Graphics operations on a pixel frame buffer generally fall into two classes; those which access the frame buffer in raster scan order, and those which access the frame buffer in random accesses.

As discussed above, raster scan line accesses may be made in a page mode if display memory 21 is organized in a raster scans formation. However, random access may force page misses.

Since only a portion of a number of scan-lines are updated, a larger number of page misses can be forced during such a transfer without slowing down the CPU cycle and affecting the performance of host CPU 15.

Such random accesses can not be truly random, however, but rather have a high locality reference in X-Y space. In other words, such random accesses may tend to have XY addresses close to those of a previously accessed pixel. For example, a bit-block-transfer (bitblt) operation reads and writes data in rectangles or can be relatively square. Thus, one alternative to the prior art approach of scan line and random accesses is to organize display memory on a tile basis rather than a scan line basis.

Figure 3:
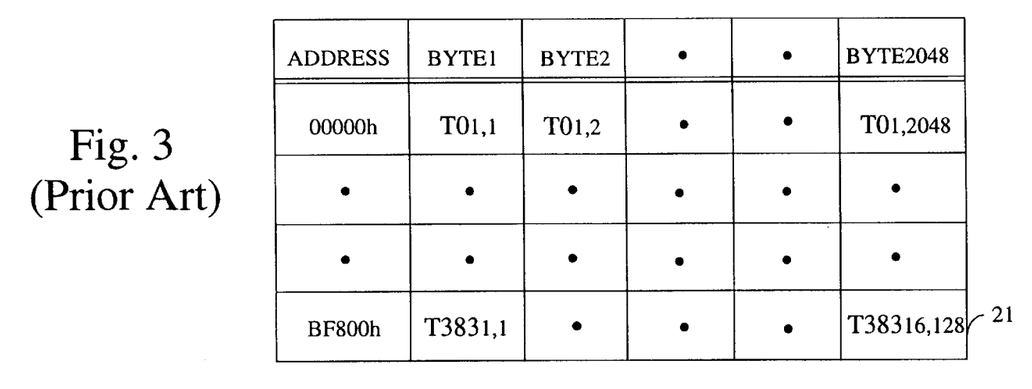
FIG. 3 is a simplified block diagram illustrating how a prior art display memory is organized in a tile.

FIG. 3 illustrates a display image and memory organization for a tile image. In the tile architecture shown in FIG. 3, a memory map of display memory 150 using a tiled addressing mode is illustrated. In the example of FIG. 3, display memory 21 is provided with a row size of two kilobytes (2048 bytes) and display 23 is configured having a 1024-768 resolution of 8 bits per pixel. These resolution and memory sizes are used by way of illustration only and are not intended to limit the scope of the present invention.

In the example illustrated in FIG. 3, each row of display memory 21 contains data for each individual tile. Each tile comprises 128×16 pixels or 2048 pixels. Each pixel in FIG. 3, for a tile is represented by P2 xy where 2 represents the tile number (0-383), x the row number in the tile (1-16) and y the pixel position within a row (1-128).

In the tile configure memory shown in FIG. 3, the graphics processor is able to fetch pixel data faster than in a scan line formatted memory, thereby reducing the host CPUs cycle time. However, in some situations, the transfer of a block of pixel data may cross an X axis (i.e. X crossing) in display memory 21 as shown in FIG. 4.

Figure 4:
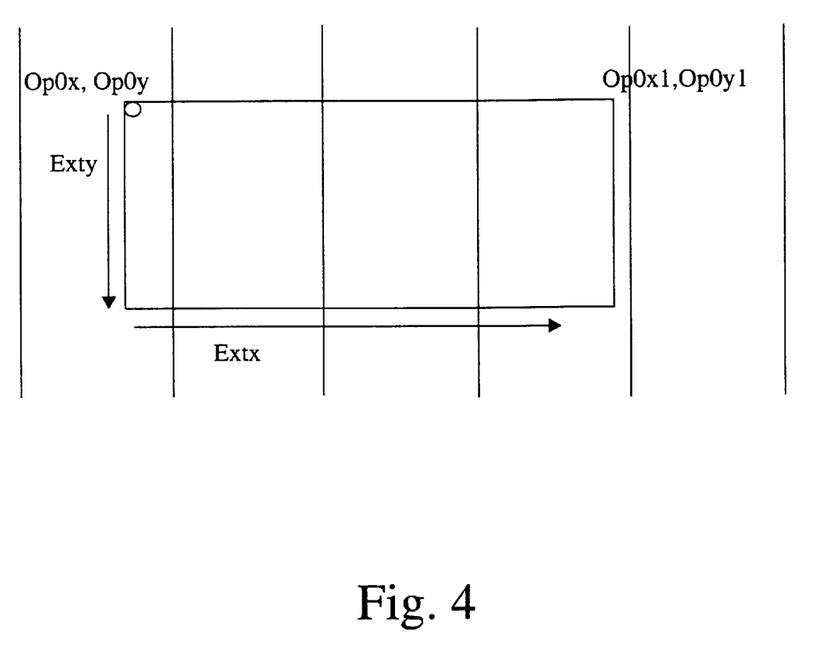
FIG. 4 is an exemplary diagram depicting the concept of tile X and Y crossing.

FIG. 4 illustrates a X directional crossing in a tile configured memory device in the prior art. X crossing is typically implemented because the memory device (e.g. display memory 21 ) in which pixel data is fetched and stored requires sequential accesses to correctly fill the memory device. Such sequential access requirements incur an inordinate amount of accesses to the SRAM if data being fetched or stored crosses an X boundary.

Thus, even though pixel data accesses to the display memory 21 may be random in a scan line configured memory as in FIG. 2 or a tile configure memory as in FIG. 3, the number of memory cycles required to complete an access to the pixel data where the pixel data crosses an X boundary can be rather excessive. The inordinate amount of memory cycles to access X crossing pixel data can in turn affect the overall system performance.

Thus, a system in which pixel data can be accessed from memory, especially when the pixel data crosses an X crossing in a tiled memory architecture, without incurring an inordinate amount of memory cycles is needed. More particularly, a system in which X crossing is avoided is needed.

SUMMARY OF THE INVENTION

This need and others are substantially met through the provision of a method and a system for performing fast pixel data block accesses to memory when the pixel data crosses an X boundary in a tile configured memory device without implementing X crossing operations of the prior art.

In accordance with the preferred embodiment of the present invention, storage devices internal to a graphics processor are monitored to determine when a fetch or store request crosses a X boundary in order to implement the fast bit-block data transfer (blt) principles of the present invention. The preferred embodiment of the present invention preferably includes a graphics processor coupled to a system bus for receiving display instructions from a host processor. The host processor provides instructions for pixel data for graphics primitives to be rendered by the graphics processor.

The graphics processor includes a plurality of internal fetch static random access memory (SRAM) devices, each about 128 byte wide and tile configured to store data fetched by the graphics processor from an external memory source. The graphics processor also includes a two/three dimensional (2D/3D) engine which includes a data striping unit for internally striping pixel data processed by the graphics processor when the pixel data crosses an X boundary in memory before the pixel data is rendered to a display device.

In the preferred embodiment of the present invention, the striping unit includes an address conversion unit for converting XY pixel addresses into byte addresses to fit tiles in the internal SRAM. The byte address conversion enables the striping unit to provide pixel data requested by the graphics processor in bit-blocks (blt) which are transferred in a blt operation. The X striping unit also includes an X crossing circuitry to monitor and detect when the pixel data being accessed by the graphics processor crosses an X boundary. The X striping unit receives the initial and destination pixel address values, the x_extent value (x address increments in the x direction) and the y_extent value (y address increments in the y direction) and calculates the x_extent of data being accessed from the current pixel position. By calculating the x_extent of the data being fetched, the X striping unit is able to preprocess the pixel data being fetched in blocks and simultaneously provide the data blocks to the SRAM without implementing the typical sequential access experienced in the prior art.

Accordingly, the present invention is able to fetch and store requests in a lesser number of memory cycles than the prior art's sequential method of accessing pixel data. This and further advantages of the present invention will become apparent upon reading the detailed description which follows.

BRIEF DESCRIPTION OF THE DRAWINGS

A better understanding of the present invention can be obtained when the following detailed description of the preferred embodiment is considered in conjunction with the following drawings in which.

DETAIL DESCRIPTION OF THE PRESENT INVENTION

A method and apparatus for providing a means of internally storing and fetching XY pixel addresses without crossing an X boundary in a graphics device is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well know methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result.

The steps are those requiring physical manipulations of physical quantities. Usually, signals capable of being stored, transferred, combined, compared, and otherwise manipulated in a computer system. For reasons of convenience, and with reference to common usage, these signals are referred to as bits, values or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 5:
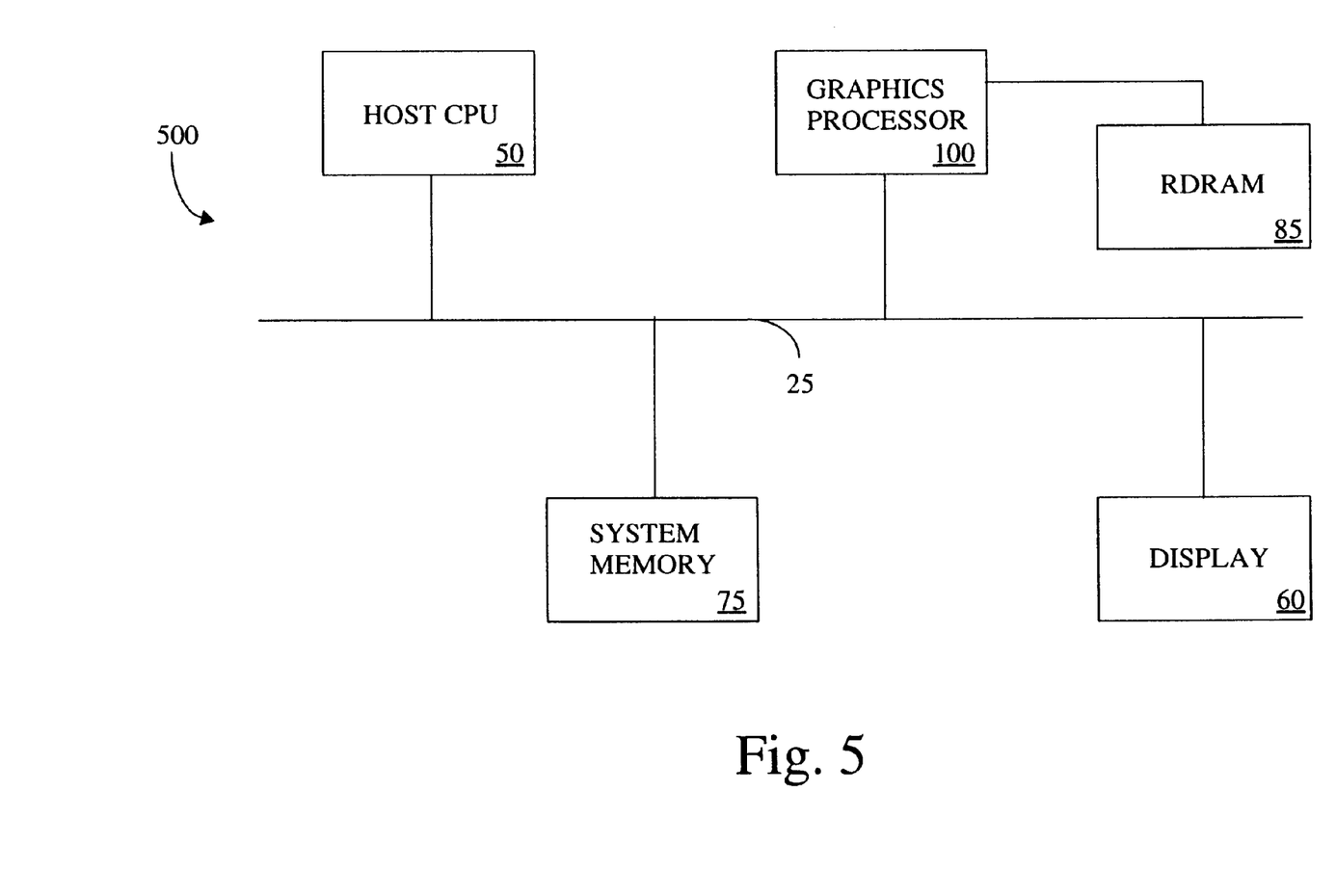
FIG. 5 is a simplified block diagram of a computer system having a graphics processor, in accordance with the principles of the present invention.

With reference to FIG. 5, a block diagram is shown of a host computer system 500 used by the preferred embodiment of the present invention. In general, host computer 500 comprises a bus 25 for communicating data and instructions, a host processor (CPU) 50 coupled to bus 25 for processing data and instructions, a computer readable memory unit 75 coupled to bus 25 for storing data and instructions from the host processor 50.

The host processor 50 provides data and control signals via bus 25 to a graphics hardware subsystem. The graphics hardware subsystem includes a graphics processor 100 which executes a series of display instructions found within a display list. The graphics processor 100 supplies data and control signals to a frame buffer 85 which refreshes the display device for rendering images on display device 60. The display device 60 utilized with the computer system 500 of the present invention can be a liquid crystal device, cathode ray tube, or other display device suitable for creating graphics images and alphanumeric characters recognizable to the computer user.

It should be understood that the particular embodiment shown in FIG. 5 is only one of many possible implementations of a graphics system for use in a computer system. The system shown in FIG. 5 is simplified for purposes of clarity so that many components and control signals are omitted which are not necessary to understand the present invention.

In the preferred embodiment, the graphics processor 100 provides hardware support for 2D and 3D graphics, and for text and windowing operations of a computer system. The graphics processor 100 transfers digital data from the system memory 75 or host processor 100, and processes data for storage in the frame buffer (RDRAM) 75 ultimately for display on the display unit 60. RDRAM 85 of the preferred embodiment is a RAMBUS type dynamic random access memory device.

The host processor 50 and system memory 75 both preferably communicate with the graphics processor 100 via the system bus 25. The system bus 25 preferably is the peripheral component interconnect (PCI) bus.

Still referring to FIG. 5, the graphics processor 100 couples to the system bus 25. In accordance with the preferred embodiment, the graphics processor 100 preferably includes bus mastering capabilities, thus permitting graphics processor 100 to bus master the system bus 25. Graphics processor 310 also couples to a display unit and a RDRAM 85.

In the preferred embodiment, the RDRAM 85 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 60.

The display unit 60 may be any suitable type of display device, such as a cathode ray tube (CRT) for desktop, workstation or server applications, a liquid crystal display (LCD) or any other suitable display device for a personal computer.

The RDRAM frame buffer 85 provides a performance improvement by permitting faster access to display list instructions and pixel data, compared to accessing data stored in the main memory 75 of the host computer system 500. The graphics processor 100 communicates to the RDRAM buffer 85 through address data and control lines, collectively referred to as a RBUS 101.

Figure 6:
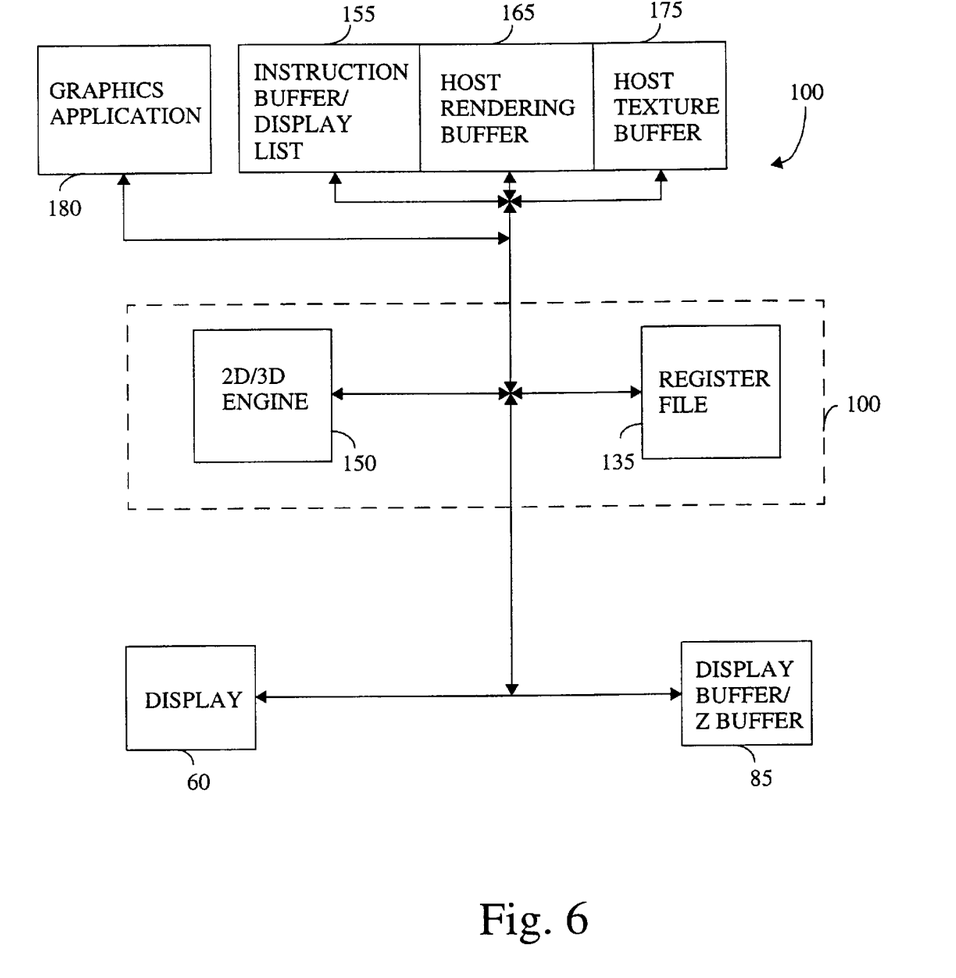
FIG. 6 is a simplified block diagram showing in detail the graphics processor of FIG. 5.

Referring now to FIG. 6, the graphics processor 100 preferably includes a register file 135 and a 2D/3D engine 150 for generating three and two dimensional primitives. The system shown in FIG. 6 includes an instruction buffer 155, a host rendering buffer 165 and a host texture buffer 175. Buffers 155, 165 and 175 store the instructions and parameters generated by the graphics application 180. As one skilled in the art will understand, buffers 155, 165 and 175 may reside in the processor 50 or system memory 75 of FIG. 5.

Still referring to FIG. 6, the graphics processor 100 preferably includes the register file 135 and the 2D/3D engine 150. Other logic may also be provided as part of the graphics processor but are left out here so as not to obfuscate the present invention.

The register file 135 receives the instructions and display information from buffer 155 for subsequent use by the 2D/3D engine 150. The 2D/3D engine 150 receives the instructions and display parameters from the register file 135 and generates values for each pixel for rendering on display unit 60. The 2D/3D engine 150 stores the pixel data internally in an storage device in the graphics processor 100 before rendering the pixels to display unit 60 or to the RDRAM 85 (FIG. 5).

Figure 7:
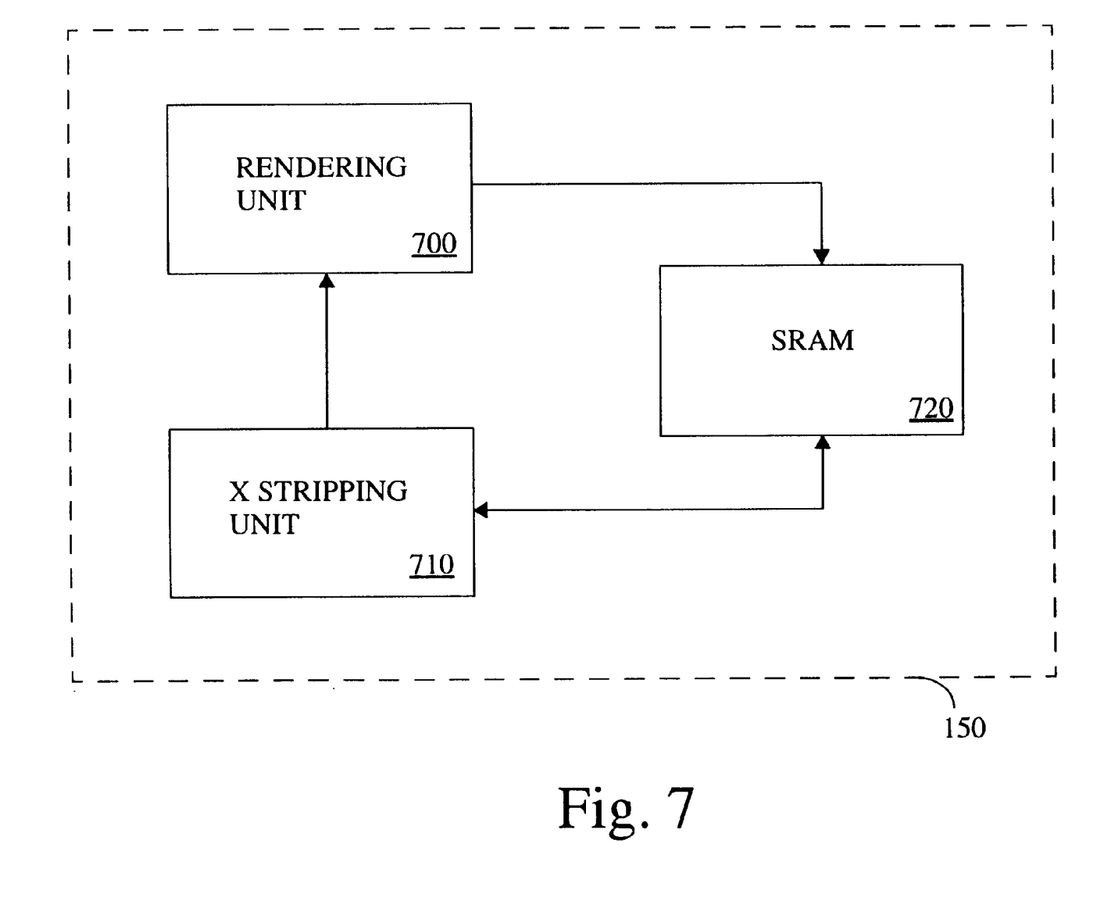
FIG. 7 is a simplified block diagram showing in more detail portions of the 2D/3D engine of FIG. 6.

Referring now to FIG. 7, the 2D/3D engine 150 constructed in accordance with the principles of the present invention is shown. The 2D/3D engine 150 preferably includes a poly rendering engine 700, X striping unit 710 and internal SRAM 720. The 2D/3D engine 150 includes other components which are not shown here for the purpose of not obfuscating the present invention.

As shown in FIG. 7, the poly rendering unit 700 couples to the SRAM 720 and X striping unit 710 via lines 702 and 701 respectively. The poly rendering unit 700 preferably receives and stores vector data or parameters into register file 135 (FIG. 6) for points, lines, polygons and other graphics geometric quantities and then calculate or otherwise interpolate pixel positions for various geometric quantities and characteristics in SRAM 720. In the preferred embodiment of the present invention, the SRAM 720 is a tile configured static random access memory device.

The poly rendering unit 700 further determines address values for bit-block data (blt) transfer operations in the 2D/3D engine 150.

The X striping unit 720 couples to the poly rendering unit 700 to receive the initial and destination pixel addresses for the block of pixel data being accessed in SRAM 720. The X striping unit 720 strips the pixel data accessed if the data crosses an X boundary and initiates a blt operation to transfer the data accessed to the poly rendering unit 700. The operation if the X striping unit 710 is described in detail below.

Figure 8:
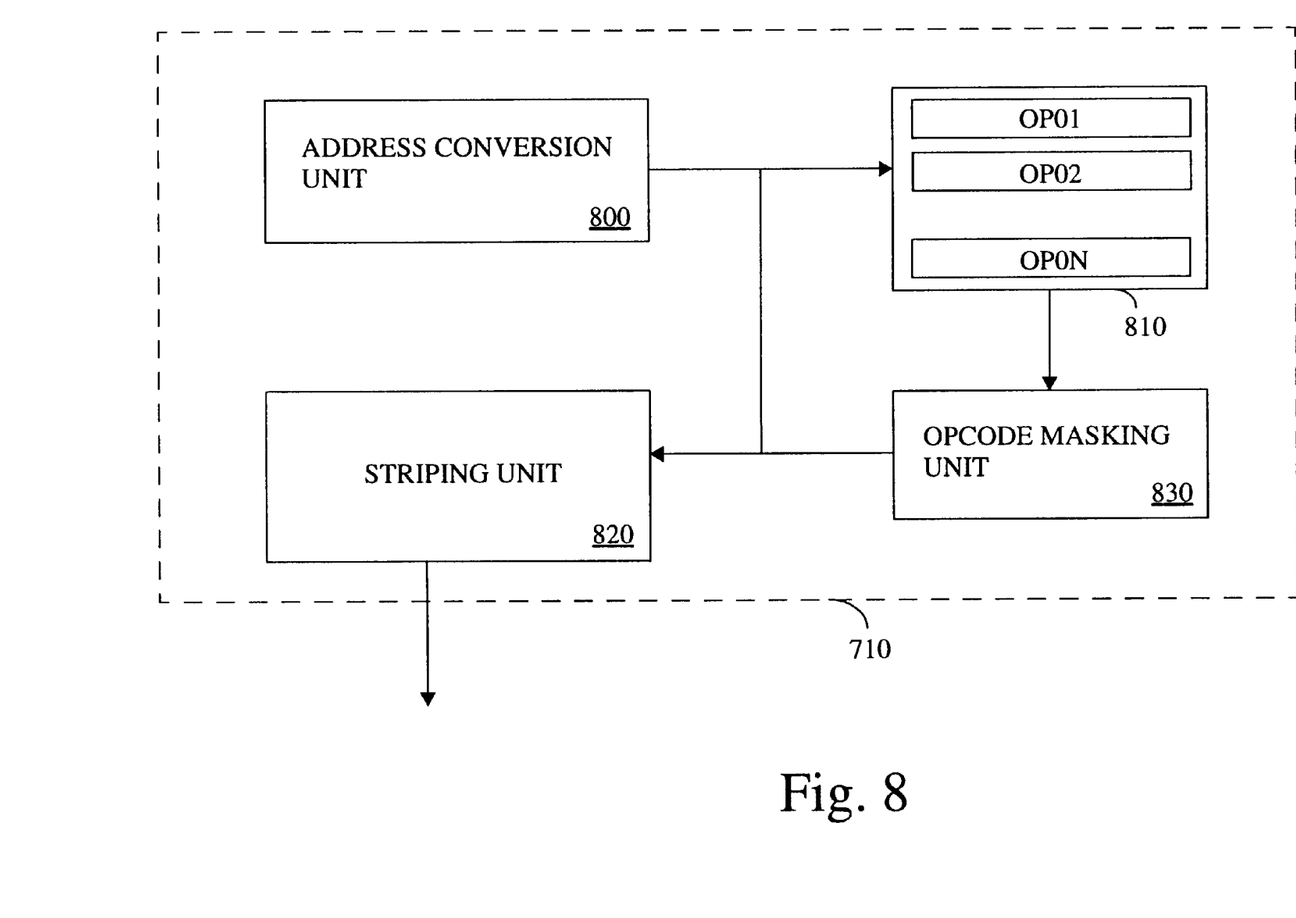
FIG. 8 is a simplified block diagram showing the X striping unit of the 2D/3D engine of FIG. 7 in accordance with the principles of the present invention.

Referring now to FIG. 8, the X striping unit 710 constructed in accordance with the preferred embodiment of the present invention is illustrated. As shown in FIG. 8, the X striping unit 710 includes a XY pixel address convert unit 800, a bit-block (blt) transfer operational code (blt opcode) unit 810, a strip X unit 820 and a tile length masking unit 830.

The XY pixel convert unit 800 receives as inputs the XY pixel addresses provided by the rendering unit 700 (FIG. 7). The XY pixel address is converted into a corresponding byte address in the SRAM 720 to enable a block transfer (blt)

operation to be performed by the X striping unit 710. The XY pixel address unit 800 includes logic to predetermine whether an byte block of data being accessed crosses a X tile boundary. If the data being accessed crosses an X tile boundary, the block of data is strip by the strip x_extent unit 820.

The XY pixel address convert unit 800 receives XY instructions from opcode unit 810 for determining whether a particular pixel address needs striping. An exemplary code excerpt for implementing the XY pixel address convert unit 800 which is implemented in Verilog code in a manner well known in the art to generate the required hardware circuitry is as follows:

```
//convert pixel to byte address
if (bltopcode&Useop0)
    begin
        op0x = pixel_convert(op0x);
    end
end
```

MIKE GIVE ME AN EXAMPLE OF ACTUAL PIXEL ADDRESS CONVERSION FROM XY PIXELS TO BYTES

The opcode unit 810 comprises a plurality of registers for storing opcode instructions (data bits) corresponding data access requests to the SRAM 720. The opcode unit 810 includes registers storing enabling and disabling data information for enabling and disabling X striping, push registers for storing modified opcode instructions for implementing blt operations and registers for storing data for incrementing and decrementing byte accessed positions in the SRAM 720.

In the preferred embodiment of the present invention, data bits in the push registers are set to push modified blt opcode calculated based on the x_extent values of the XY pixel addresses to disable or enable X striping during a particular access to SRAM 720.

The opcode unit 810 further includes registers for storing address increment data bits which may be set to calculate and monitor striping operations in the striping unit 800 as XY pixel addresses are converted and accessed as bytes of data blocks (blts) from SRAM 720.

A representative example of an opcode register for opcode unit 810 is shown in table I for purposes of illustration.

TABLE I

| Disable/<br>Enable bit | Opcode | opcode for poly<br>engine |
| --- | --- | --- |

An exemplary code excerpt for generating hardware circuitry for the opcode unit in Verilog is as follows:

```
//push Op0
    if (bltOpcode & Use Op0)
        begin
            push(Op0y, Op0x);
        end
    end
//push Op1
    if (bltOpcode & UseOp2)
        begin
            Op2x += stripe extx
        end
    end
```

The Strip X unit 820 is coupled to the pixel address conversion unit 800 to receive the converted beginning and destination byte address of corresponding XY pixel addresses. The strip X unit 820 initializes and calculates the maximum X extents for the current pixel position and each incremental pixel position for each access request to the SRAM 720.

From the calculated maximum x_extent value, the strip unit 820 is able to predetermine whether a particular data access crosses an X boundary. If an access crosses an X boundary, the strip unit 820 stripes the access into data blocks at each X tile position. The block of data is then simultaneously accessed thereby avoiding X crossing.

In calculating the maximum length in the X direction (x_extent) for an access, the strip unit 820 initially sets the value of extents X to the maximum value of x_extent. The strip X unit 820 then calculates the maximum extent for X in the first register in opcode unit 710 (e.g. op0) and replaces the value of strip extx if the maximum address of extx for op0 is greater than the value of strip extx. In the preferred embodiment, the striping unit 820 can perform a single, double or triple X striping of pixel data accessed in the SRAM 720.

An exemplary code excerpt for generating circuitry for the X striping unit 820 in Verilog is as follows:

```
//Init stripe extent x to max ext x
    stripe_etx = extx;
//calc max extx x for Op0 and replace stripe ext x if it is >
max ext x for Op0
    If (bltopcode & UseOp0)
        begin
            temp_extx = tile_byte_length - (Op0x &
tile_byte_length_mask);
            if (temp_extx < stripe_extx)
                begin
                    stripe_extx = temp_extx;
                end
        end
```

Figure 9:
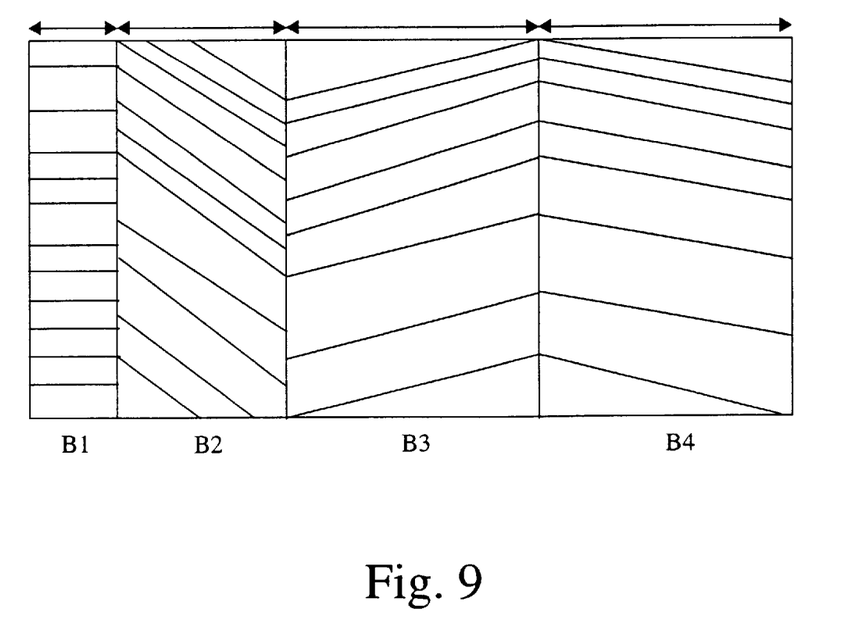
FIG. 9 is an exemplary depiction of a single striping sequence to/from the SRAM in FIG. 7 in accordance with the principles of the present invention.

Referring now to FIG. 9 is an exemplary diagram of a single striping sequence of the preferred embodiment. As shown in FIG. 9, the accessed pixel data crosses an X tile boundary (e.g. T1 –T3). The address conversion unit 800 provides the starting pixel address Op0x, Op0y and the destination address Op0x1, Op0y1, as well as the e_extent extx to the striping init 820. Base on the values provided to the striping unit 820, the striping circuitry in the striping unit is able to determine that the data being accessed crosses three tile boundaries in the x direction (i.e., T1–T3).

The striping unit hence strips the data into the optimal data block from the range of four block of data (e.g. B1–B4) based on the incremental x_extent values of the data being accessed up to the boundaries T1, T2 and T3. By breaking the data being accessed into blocks (B1–B4), the striping unit 820 is able to fill data in the SRAM 720 in the y direction and simultaneously access data blocks (B1–B4) without implementing the sequential data access typical of the prior art.

Figure 10:
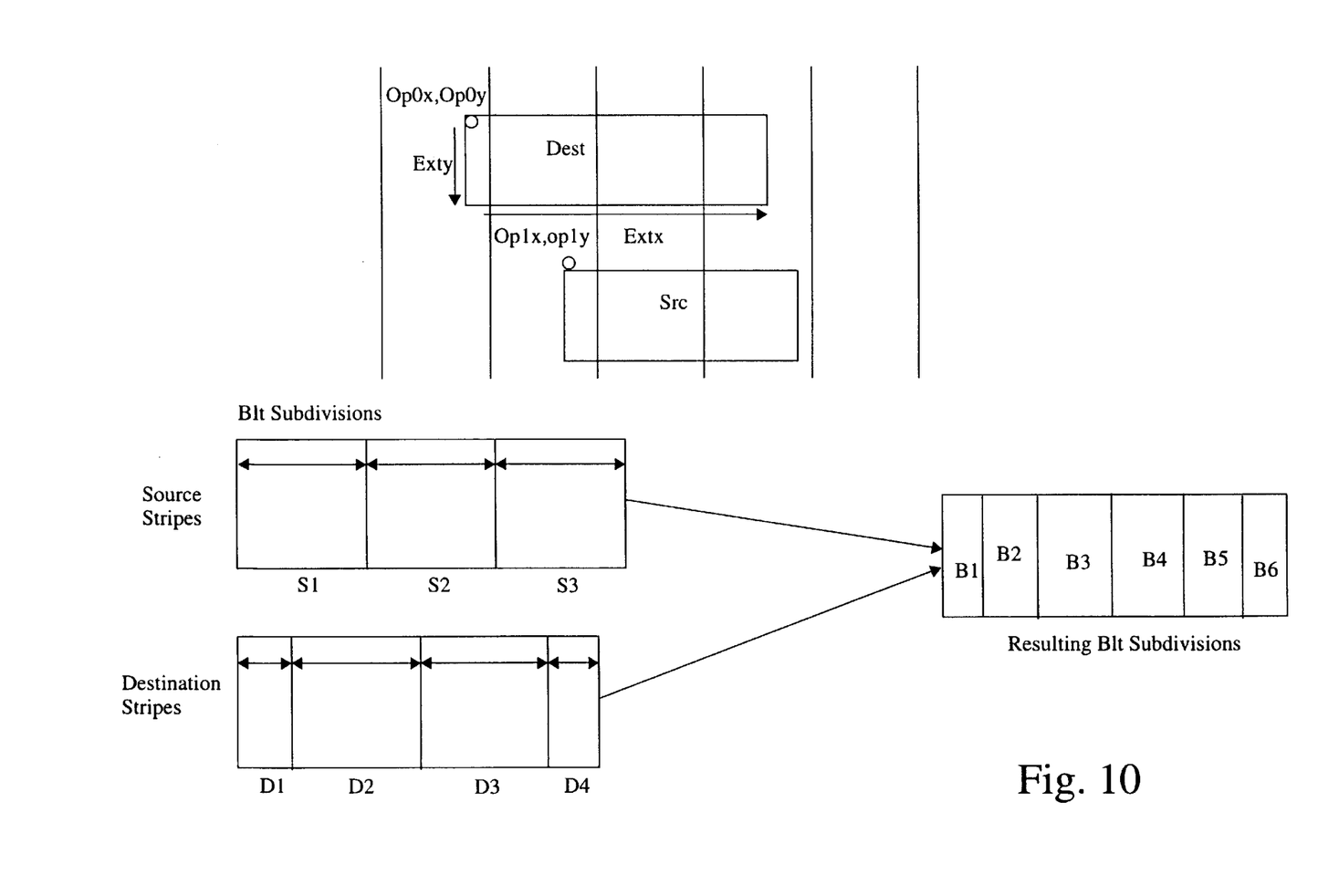
FIG. 10 is an exemplary depiction of a double striping sequence to/from the SRAM of FIG. 7 in accordance with the principles of the present invention.

FIG. 10 is an exemplary depiction of an alternate striping sequence of the preferred embodiment. The example shown in FIG. 10 illustrates a double striping sequence by the striping unit 820.

As shown in FIG. 10, source pixels (Src) can be copied to destination pixels (Dest) by dividing the block of source pixels into separate blocks to avoid X crossing to fill the destination block Dest. In the example illustrated in FIG. 10, the source pixel data (Src) rectangle is subdivided into blt subdivisions S1, S2 and S3.

To fill the destination pixel data block, the accessed destination pixel data must be subdivided into four blocks (e.g. D1–D4). To write the source (Src) pixel data rectangle to the destination pixel data (Dest) rectangle, the source Src pixel data rectangle is subdivided into six subdivisions (e.g. B1–B6) in order to avoid crossing three X tile boundaries.

By filling data accesses simultaneously in the y direction, blocks of the same pixel data can be transferred without incurring any excessive amounts of memory cycles and also X crossing is avoided. The preferred embodiment is able to achieve a single blt operation no matter how many Y scanlines are accessed.

Numerous variations and modifications will become apparent to those skilled in the art once the above disclosure is fully appreciated. It is intended that the following claims be interpreted to embrace all such variations and modifications.

What is claimed is:

1. A graphics system for internally transferring bit blocks of pixel data in tile addressed configured memory in a graphics processor, the system comprising:

a system bus;

a host processor coupled to the system bus for generating graphics primitive address requests to the system bus;

a graphics processor coupled to the system bus for processing address requests for the graphics primitives generated by the host processor and rendering the graphics primitives;

a tile configurable memory device internally disposed in the graphics processor for storing a list of display parameters for the graphics primitives; and a pixel data striping means disposed in the graphics processor for predetermining an optimal pixel data block from a predetermined range of data block to transfer wherein the pixel data striping means comprises:

an XY pixel address conversion means for converfing XY pixel addresses responsive the graphics primitive bit block of data in the tile configurable memory device;

an operation code (opcode) means for storing opcode instructions for generating the bit block of data to the tile configurable memory device; and an X striping means for striping the pixel data accessed in the tile configurable memory device if the pixel data accessed crosses an X boundary in the tile configurable memory device.

2. The system of claim 1, wherein the pixel data striping means further includes an operation code (opcode) means for storing opcode instructions for performing pixel data striping in the X striping means.

3. The system of claim 2, wherein the striping means includes preprocessing means for preprocessing blt operations in the pixel data striping unit to the tile configurable memory device.

4. A graphics processor for preprocessing bit blocks (blt) of pixel data corresponding to XY pixel address values of pixel data for performing fast blt transfer operations, the graphics processor comprising:

a two/three dimensional (2D/3D) engine including a polygon rendering unit for receiving vector data corresponding to graphics primitives for processing and generating graphics objects;

wherein the two/three dimensional (2D/3D) enqine further includes an internal storage device for storing XY pixel parameter values for rendering the graphics objects;

a register file coupled to the 2D/3D engine for storing parameter values representing the graphics objects and receiving vector data provided by the polygon rendering unit; and a pixel data preprocessing unit disposed in the 2D/3D engine for performing fast bit block (blt) transfer operations in the graphics processor;

wherein the pixel data preprocessing unit includes an XY pixel address converting unit for converting XY pixel addresses to a corresponding byte pixel address; and an X striping unit coupled to the XY pixel address converting unit for striping pixel data spanning a tile boundary in the X direction in the internally disposed storage device in the graphics processor.

5. The graphics processor of claim 4, wherein the pixel data preprocessing unit includes a plurality of operational code (opcode) registers for storing instructions for determining whether a pixel data being accessed needs to be striped.

6. The graphics processor of claim 5, wherein the X striping unit includes logic circuitry to perform a single X striping operation on a pixel data block crossing an X tile boundary.

7. The graphics processor of claim 6, wherein the X striping unit further includes logic circuitry to perform a double X striping operation wherein pixel data from a source pixel data rectangle is striped and block transferred (blted) into a destination pixel data rectangle.

8. A pixel data Striping unit comprising:

a XY pixel address conversion unit including means for converting XY pixel addresses into byte size addresses for storage in a tile configured memory device;

a X striping unit coupled to the XY pixel address conversion unit including means for determining whether pixel data being accessed crosses a X tile boundary in the memory device and means for determining whether to perform a single stripe operation of the pixel data being accessed from the memory device;

a operational code (opcode) unit coupled to the XY pixel address conversion unit; and a tile length masking unit coupled to the opcode unit.

9. The pixel data striping unit of claim 8, wherein the X striping unit further includes means for determining whether to perform a double striping operation on the pixel data being accessed from the memory device.

10. The pixel data striping unit of claim 9, wherein the opcode unit includes a plurality of registers for storing instructions for determining whether a pixel data accessed from the memory device crosses a X tile boundary.

11. A method for non-sequentially storing and fetching pixel data in a graphics processor, the method comprising the steps of:

generating a display list of XY addresses of pixel data;

determining whether the pixel data must be stored or fetched internally in the graphics processor;

determining the size of the pixel data to be fetched or stored;

determining whether the pixel data to be fetched or stored crosses an X boundary in the memory in the graphics processor;

if the pixel data crosses an X boundary, striping the pixel data before being accessed;

providing a source and destination address for the pixel data accessed by the graphics processor; and generating a block of pixel data responsive to the XY pixel address from an internal storage device in the graphics processor.

12. The method of claim 11, wherein striped portions of the pixel data is simultaneously stored in the graphics processor during a store operation.

13. The method of claim 12 further including the step of fetching the striped portions of the pixel data non-sequentially during a fetch operation in the graphics processor.

* * * * *